(12) United States Patent
David

(10) Patent No.: US 7,703,312 B2
(45) Date of Patent: Apr. 27, 2010

(54) COMPONENT WITH COMPRESSIVE RESIDUAL STRESSES, PROCESS FOR PRODUCING AND APPARATUS FOR GENERATING COMPRESSIVE RESIDUAL STRESSES

(75) Inventor: Walter David, Mülheim an der Ruhr (DE)

(73) Assignee: Siement Aktiengesellschaft, Munich (DE)

( * ) Notice: Subject to any disclaimer, the term of this patent is extended or adjusted under 35 U.S.C. 154(b) by 920 days.

(21) Appl. No.: 10/585,954

(22) PCT Filed: Dec. 15, 2004

(86) PCT No.: PCT/EP2004/014300

§ 371 (c)(1),
(2), (4) Date: Jul. 13, 2006

(87) PCT Pub. No.: WO2005/068666

PCT Pub. Date: Jul. 28, 2005

(65) Prior Publication Data

US 2008/0223099 A1      Sep. 18, 2008

(30) Foreign Application Priority Data

Jan. 15, 2004   (EP) ................... 04000775

(51) Int. Cl.
  *C21D 7/06*   (2006.01)
  *F01D 5/28*   (2006.01)
(52) U.S. Cl. ............... 72/53; 29/90.7; 451/39
(58) Field of Classification Search ........... 72/53; 29/90.7; 451/39–41
See application file for complete search history.

(56) References Cited

U.S. PATENT DOCUMENTS

| 2,701,408 | A | * | 2/1955 | Borger | 72/53 |
| 3,426,563 | A | * | 2/1969 | Burney | 72/53 |
| 4,076,566 | A | * | 2/1978 | Power | 156/153 |
| 4,350,035 | A | * | 9/1982 | Kopp et al. | 72/53 |
| 4,428,213 | A | | 1/1984 | Neal et al. | |
| 4,581,913 | A | * | 4/1986 | Reed | 72/53 |
| 4,937,421 | A | | 6/1990 | Ortiz, Jr. et al. | |
| 5,441,763 | A | * | 8/1995 | Kuo | 427/195 |
| 5,492,447 | A | | 2/1996 | Mannava et al. | |
| 5,499,519 | A | * | 3/1996 | Brunier et al. | 72/53 |
| 5,911,780 | A | | 6/1999 | Hamasaka et al. | |
| 6,038,900 | A | * | 3/2000 | Miyasaka | 72/53 |
| 6,267,558 | B1 | | 7/2001 | Dingwell et al. | |
| 6,584,820 | B1 | * | 7/2003 | Benedict et al. | 72/53 |
| 6,622,570 | B1 | | 9/2003 | Prevey, III | |
| 7,140,216 | B2 | * | 11/2006 | Garza | 72/53 |
| 2003/0115922 | A1 | * | 6/2003 | Berthelet et al. | 72/53 |

(Continued)

FOREIGN PATENT DOCUMENTS

DE    40 15 205 C1    8/1991

(Continued)

OTHER PUBLICATIONS

S.R. Lampman, F. Reidenbach; Ted Kostilnik; "ASM Handbook, vol. 5, Surface Engineering"; "Shot Peening"; 1994; ASM International, XP002327369; USA.

*Primary Examiner*—David B Jones

(57) ABSTRACT

The inventive method discloses the local, adapted and controlled introduction of internal compressive stress in convex and concave regions, such as the root region of turbine blades, by means of at least two pressure generators.

13 Claims, 12 Drawing Sheets

U.S. PATENT DOCUMENTS

2008/0223099 A1 * 9/2008 David .......................... 72/53

FOREIGN PATENT DOCUMENTS

| DE | 197 42 137 A1 | 3/1999 |
|---|---|---|
| EP | 0 230 165 A1 | 7/1987 |
| EP | 0 731 184 A1 | 9/1996 |
| EP | 1 125 695 A2 | 8/2001 |
| EP | 1 174 217 A1 | 1/2002 |
| WO | WO 01/15866 A1 | 3/2001 |

* cited by examiner

FIG 3
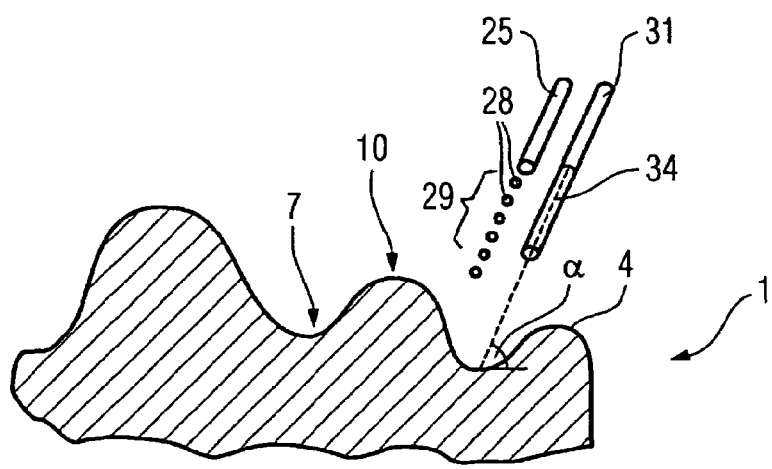
FIG 4
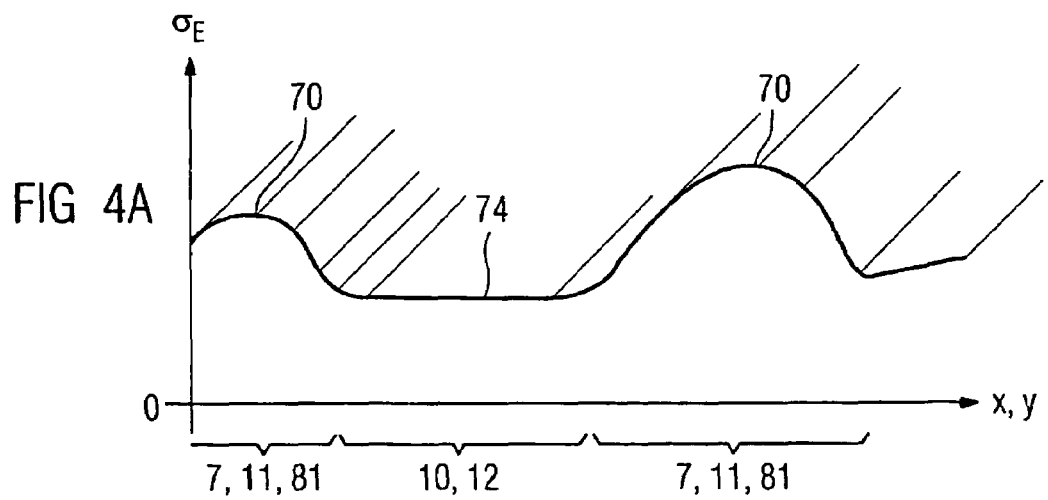
FIG 4A
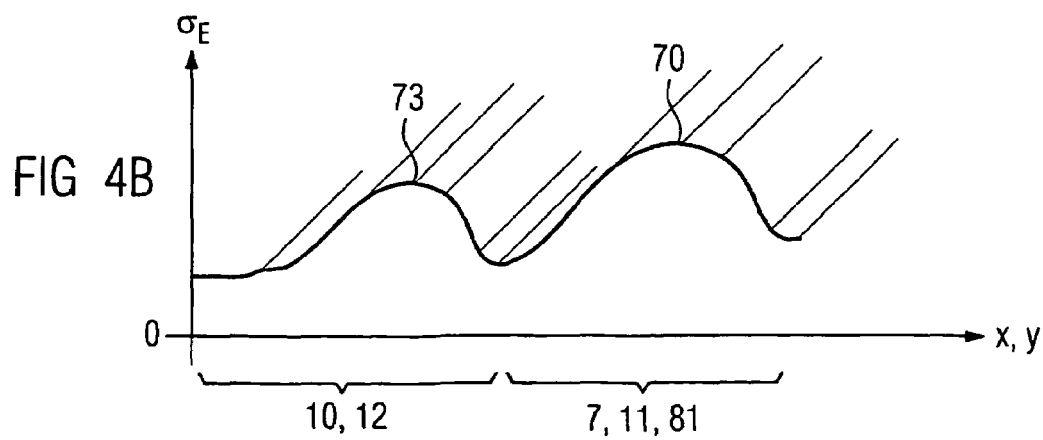
FIG 4B

COMPONENT WITH COMPRESSIVE RESIDUAL STRESSES, PROCESS FOR PRODUCING AND APPARATUS FOR GENERATING COMPRESSIVE RESIDUAL STRESSES

CROSS REFERENCE TO RELATED APPLICATIONS

This application is the US National Stage of International Application No. PCT/EP2004/014300, filed Jan. 15, 2004 and claims the benefit thereof. The International Application claims the benefits of European Patent application No. 04000775.9 filed Jan. 15, 2004. All of the applications are incorporated by reference herein in their entirety.

FIELD OF THE INVENTION

The invention relates to a component having compressive residual stresses in accordance with the claims and to a process for producing a component having compressive residual stresses as described in the claims and to an apparatus for generating compressive residual stresses as described in the claims.

BACKGROUND OF THE INVENTION

Compressive residual stresses are often introduced into components which are subject to high mechanical loads, to enable the components to withstand increased stresses. This is in some cases carried out in the case of fir-tree-like roots of blades or vanes of turbines (steam turbines, gas turbines).

Compressive residual stresses can be introduced by roller-burnishing. Another way of generating compressive residual stresses is shot-peening. U.S. Pat. No. 5,911,780 shows a method of this type for generating compressive residual stresses.

U.S. Pat. No. 5,492,447 discloses a process for generating compressive residual stresses in rotor components by means of a laser.

A similar process is disclosed in EP 731 184 B1.

WO 01/15866 A1 shows a process for the surface treatment of a component in which at least one peening parameter in an abrasive peening process is adapted to the contour line of the component. DE 197 42 137 A1 shows a rolling apparatus for generating compressive residual stresses.

U.S. Pat. No. 4,428,213 discloses a component in which a first region and then the entire component are shot-peened with a lower intensity.

EP 0 230 165 A1 and EP 1 125 695 A2 disclose a robot which guides a tool with respect to a component that is to be processed.

U.S. Pat. No. 4,937,421 discloses a laser irradiation method and an associated apparatus, in which the laser beam from a laser is split into two beams in order in this way to generate a larger irradiation surface area on the component to be processed, thereby achieving a faster processing time. These two laser beams are guided jointly and have the same parameters in terms of angle of incidence and intensity, and are guided jointly in one holder.

Components according to the prior art do not have sufficient strength for unusual operating states with regard to the desired demands imposed on the locally different operating stresses.

SUMMARY OF THE INVENTION

Therefore, it is an object of the invention to overcome this problem.

The object is achieved by the component, by the process and by the apparatus for generating compressive residual stresses in a component as claimed in the claims.

Further advantageous measures are listed in the subclaims. The measures listed in the subclaims can be combined with one another in advantageous ways.

BRIEF DESCRIPTION OF THE DRAWINGS

FIG. 3 shows a schematic arrangement of an apparatus which can be used to carry out the process according to the invention, FIGS. 4, 18, 19 (schematically) show the lateral profile of the compressive residual stresses.

DETAILED DESCRIPTION OF THE INVENTION

Figure 1:
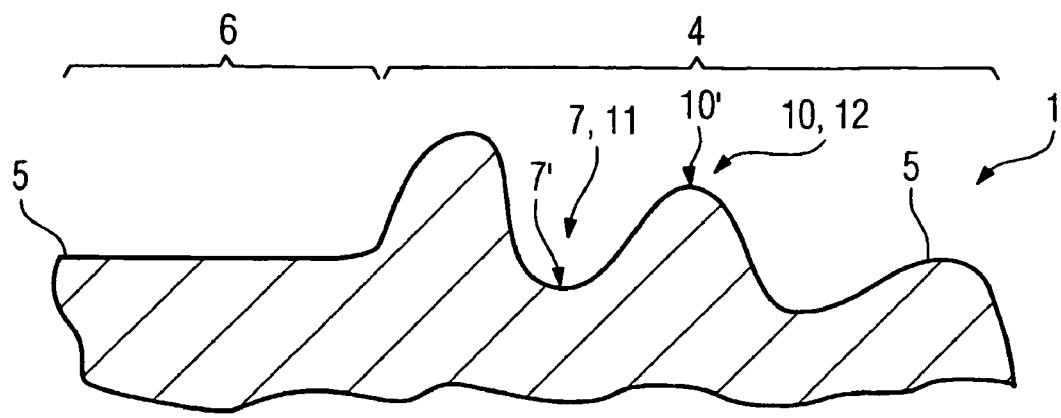
FIGS. 1, 2 show a component which has a curved surface.
Figure 16:
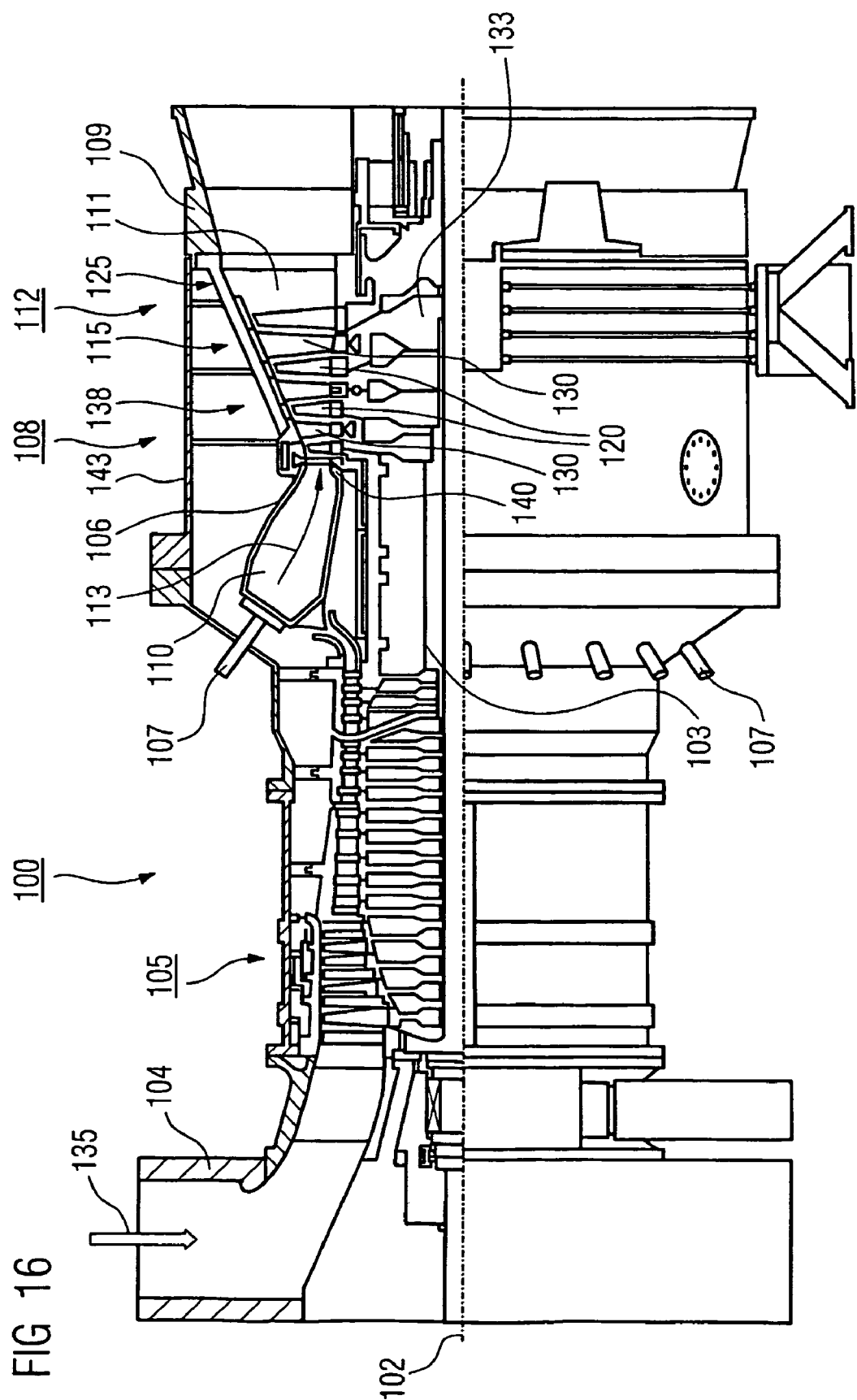
FIG. 16 shows a gas turbine.

FIG. 1 shows a component 1 having a surface 5. The component 1 may be a component of a steam turbine (FIG. 17) or of a gas turbine, such as for example an aircraft turbine or a turbine for generating electricity 100 (FIG. 16). Components of this type are, for example, turbine blades or vanes 120, 130, 342, 354, a combustion chamber lining or other housing parts.

The surface 5 of the component 1, 120, 130, 342, 354 is composed, for example, of a plurality of, in this case two, surface regions 4, 6. A surface region 6 (for example main blade or vane region 40, FIG. 15) is, for example, planar or has just a single curvature, whereas the surface region 4 is multiply curved. Different compressive residual stresses $\sigma_E$ that are different than zero are present in the surface 5 and its surface regions 4 and/or 6.

The component 1, 120, 130, 342, 354 has a concavely curved region 7 of the surface region 4, which for example while the component 1, 120, 130, 342, 354 is in use is exposed to higher mechanical stresses than another, convexly curved region 10 of the surface region 4.

The surface region 4 of the component 1, 120, 130, 342, 354 at least in part has concavely 7 (a valley 11) and convexly 10 curved regions (peak dome 12), resulting in local maxima 10' and local minima 7'. A convexly curved region 10, 12 for example adjoins the concavely curved region 7, 11.

By way of example, a higher external mechanical stress is applied to the concavely curved region 7, 11 than to the convexly curved region 10, 12 when the component 1, 120, 130, 342, 354 has been installed.

Compressive residual stresses $\sigma_E$ can be introduced in the surface region 4 by surface treatment processes. This is done by means of suitable pressure generators 25 (FIG. 3), for example by roller-burnishing, shot-peening or laser irradiation.

Figure 2:
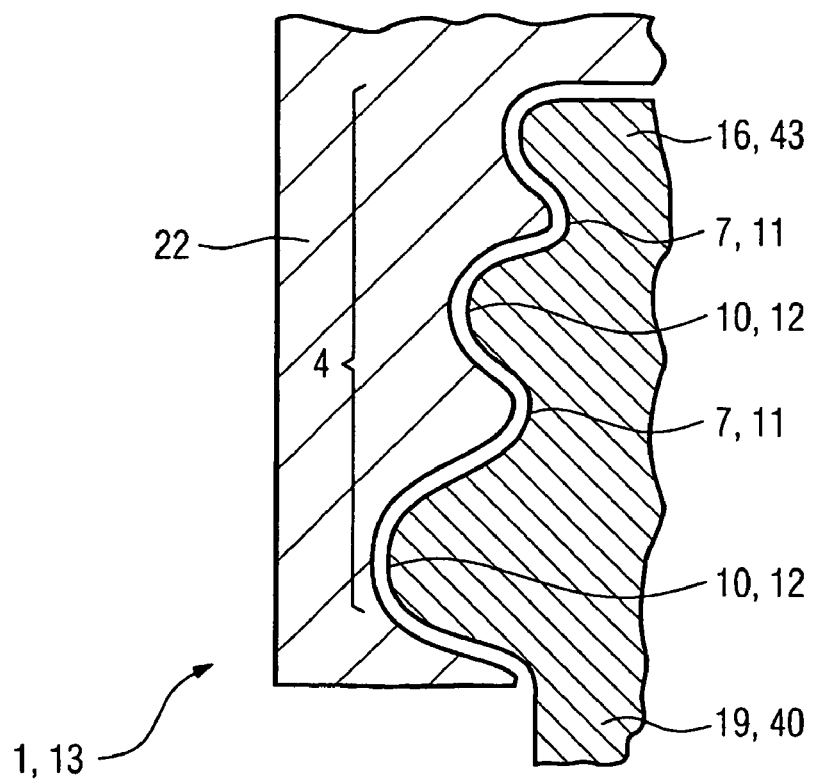

As installed component 1, FIG. 2 shows, by way of example, a subregion of a turbine blade or vane 13 (FIG. 15), namely a blade or vane root 43 (FIG. 15) in its securing region 16 (FIG. 15) with its fir-tree-like or dovetail-like structure as multiply curved surface region 4.

Figure 17:
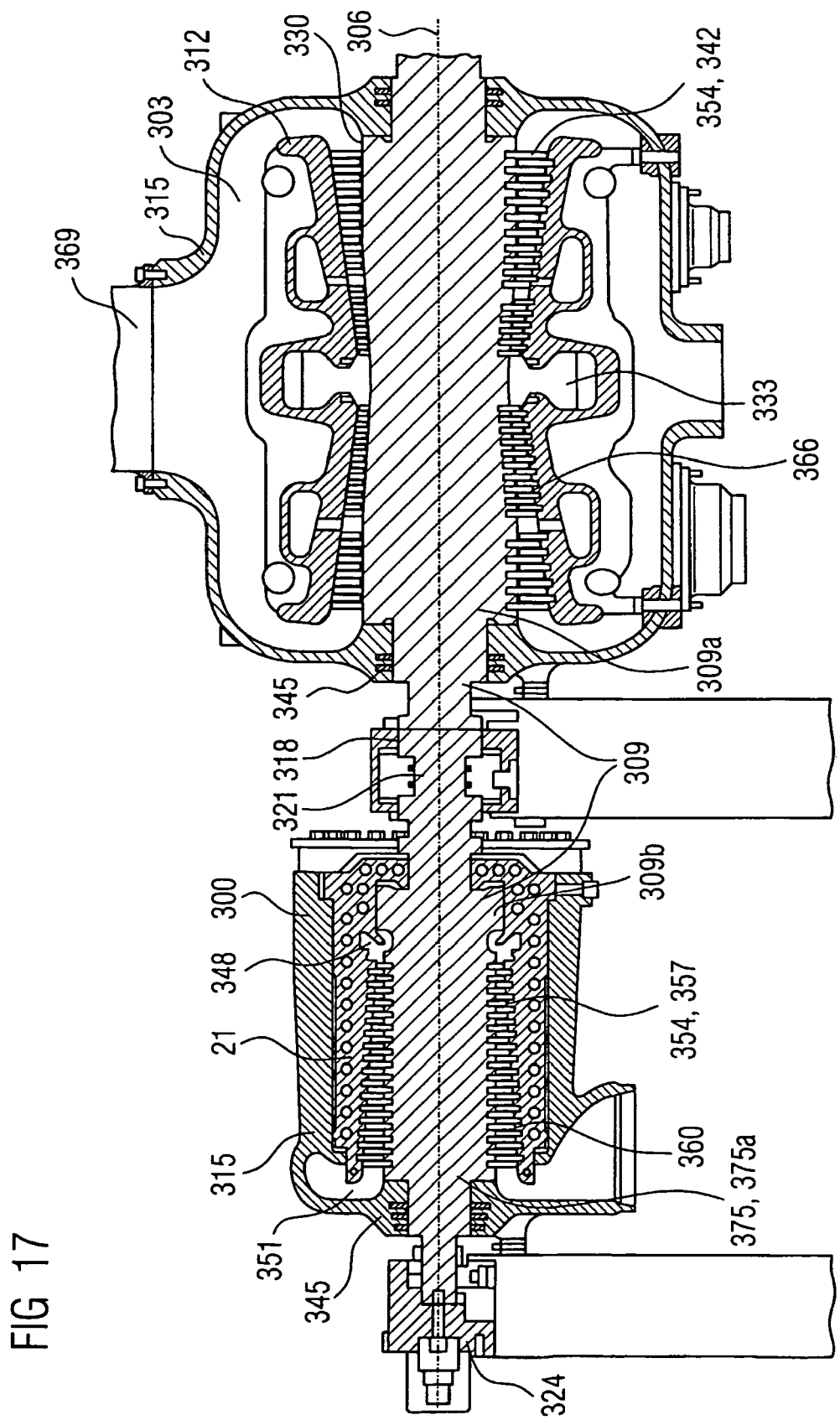
FIG. 17 shows a steam turbine.

The blade or vane root 43 is, for example, arranged and held in a suitably shaped disk 22. The disk 22 is in turn arranged on a shaft 103 of a gas turbine 100 (FIG. 16) or steam turbine (FIG. 17). High mechanical loads occur in particular in the concavely curved region 7, 11. Therefore, there is a need to influence the component 1 locally in these regions in such a way that it is possible for higher tensile stresses to be withstood there, by virtue of the local tensile stresses being at least partially compensated for. However, this has to be done in a controlled way and as a function of the geometry in targeted fashion using locally different compressive residual stresses $\sigma_E$.

The turbine blade or vane 13 can also be secured to the shaft 103.

FIG. 3 diagrammatically depicts how a pressure generator 25 and component 1, 120, 130, 342, 354 are moved with respect to one another. According to the invention, compressive residual stresses $\sigma_E$ are generated in the component 1, 120, 130, 342, 354 starting from the surface region 4 and extending into the depth of the component 1, 120, 130, 342, 354.

This can be done in particular by roller-burnishing, laser irradiation or shot-peening. By way of example, the process according to the invention is explained in more detail on the basis of shot-peening. The fundamental procedure and the choice of parameters can be transferred analogously to laser irradiation, roller-burnishing or other processes used to generate compressive residual stresses. (A mechanical momentum of the shot corresponds to a power density of a laser or a contact pressure of a roller-burnishing tool.)

A shot-peening nozzle 25 as pressure generator blasts out peening abrasive 28 (shot) at a certain velocity, forming a particle jet 29, in particular a shot jet 29. The shot 28, in particular steel shot, impinges on the surface region 4 of the component 1 where, by virtue of its mechanical momentum, it generates a peening pressure on the surface region 4, so that compressive residual stresses $\sigma_E$ are generated there.

The shot-peening nozzle 25 can be controlled using laser beams 34 from a laser 31 in such a way that it is also accurately guided along curved contours in the predefined region. In particular the distance, the angle of incidence α, i.e. the angle of the shot-peening nozzle 25 with respect to the surface 5 in the surface region 4, 6, can be adapted. The angle of incidence α is, for example, less than 90° and is in particular between 80° and 85°.

It is also possible for the peening pressure of the shot jet 29 to be set for the shot-peening nozzle 25. Further parameters include the size of the peening abrasive 28, the material of the peening abrasive 28 or the shape of the nozzle opening (laser: beam shape; roller-burnishing: shape of the tool).

The component 1 is, for example, clamped in a fixed position, in which case, by way of example, in a first process step the laser beams 34 of the laser 31 scan the surface region 4 of the component 1 under CNC control. In this arrangement, either the component 1 is mounted on a CNC machine and displaced with respect to the laser 31, or vice versa.

The precise geometry of the component 1 is recorded by this scanning of the surface region 4 of the component 1. Stipulation of defined regions (for example the concavely curved regions 7) defines regions which are treated using the shot-peening nozzle 25. It is also possible for the recording of the surface region 4 to be followed, for example automatically, by a calculation which determines which regions are exposed to particularly high mechanical loads, so that the extent and level of the compressive residual stresses $\sigma_E$ which are to be generated by means of shot jets 29 can be defined accordingly.

The level of the compressive residual stresses $\sigma_E$ which is to be generated is also used to define the parameters of the shot-peening nozzle 25 with respect to the concave or convex regions 7, 10 which are to be peened. This is therefore a method in which the surface region 4 is treated with different parameters in a locally targeted way in a process, so that after the process has been carried out, locally predefined but different compressive residual stresses $\sigma_E$ are present over the entire surface.

The entire surface region 4 on which compressive residual stresses $\sigma_E$ are present corresponds, for example, to the surface of a fir-tree-like blade or vane root 43 of the turbine blade or vane 13, 120, 130, 342, 354. In this context, the term locally different means that regions which have high and lower compressive residual stresses $\sigma_E$ that are different than zero are generated after the process has been carried out.

For example, high compressive residual stresses $\sigma_E$ are generated in particular in the concavely curved regions 7, 11, whereas lower compressive residual stresses $\sigma_E$ are generated in the remaining convexly curved regions 10, 12. In particular, no curved surface 7, remains untreated, so that at least one convexly curved region 10 and a concavely curved region 7 have compressive residual stresses $\sigma_E$ in their entire surface region.

The shot jet 29 is controlled by the laser 31 and, for example, by a CNC machine which moves the shot jet 29 with respect to the component 1 in order to allow different regions 7, 10 to be peened.

FIG. 4 a) shows an exemplary distribution of the compressive residual stresses $\sigma_E$ in an x-y plane.

In the concavely curved region 7, 11, which has the higher compressive residual stresses $\sigma_E$, there is a maximum 70 in the compressive residual stress $\sigma_E$ within the x-y plane. The convexly curved region 10, 12 has a plateau 74 of lower compressive residual stresses $\sigma_E$. However, the maximum 70 and all the values for the region 7, 11 are higher than the value of the plateau 74.

Therefore, the term locally different compressive residual stresses means that the compressive residual stresses $\sigma_E$ are higher in the concavely curved region 7, 11 than in the plateau 74 in the convexly curved region 10, 12 having the lower compressive residual stresses $\sigma_E$.

FIG. 4 b) shows a further exemplary distribution of the compressive residual stresses $\sigma_E$ in an x-y plane.

In the concavely curved region 7, 11, which has the higher compressive residual stresses $\sigma_E$, there is a maximum 70 in the compressive residual stress $\sigma_E$ within the x-y plane. The convexly curved region 10, 12 has a maximum 73 of lower compressive residual stresses $\sigma_E$.

However, the maximum 70 is higher than the maximum 73. Therefore, the term locally different compressive residual stresses means that the maximum 70 in the compressive residual stress $\sigma_E$ in the region 7, 11 is higher than the maximum 73 in the convexly curved region 10, 12 having the lower compressive residual stresses $\sigma_E$.

Although the concavely curved region 7, 11, as can also be seen in FIG. 4b), at some locations has lower compressive residual stresses $\sigma_E$ than the convexly curved region 10, 12, in particular in the transition region between the concavely curved region 7, 10, this means that it is not a punctiform comparison of compressive residual stresses $\sigma_E$ that should be used to define the regions with higher compressive residual stresses $\sigma_E$ and lower compressive residual stresses $\sigma_E$, but rather the height of the maxima 70, 73 should be used as the basis for such comparison.

Figure 18:
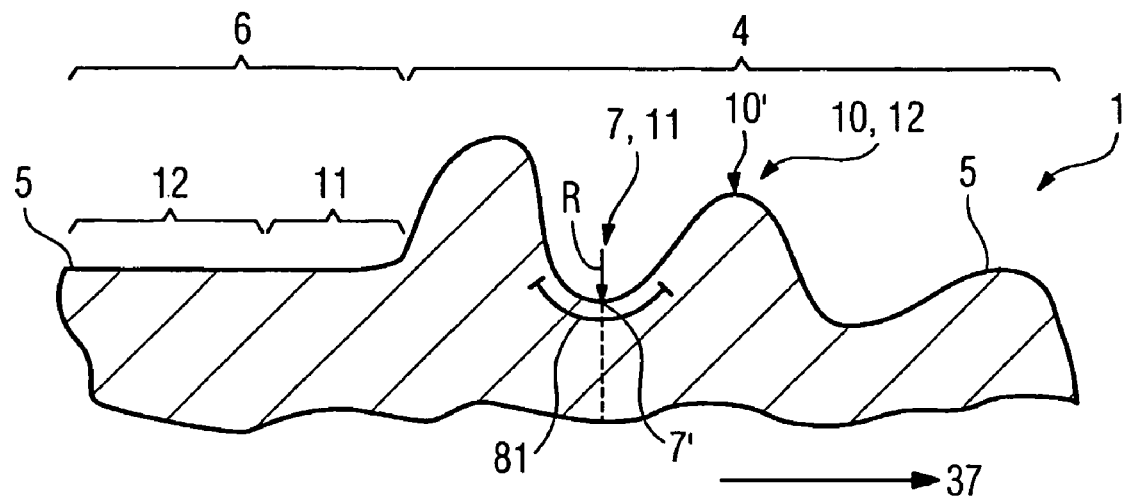

FIG. 18 shows a component 1 according to the invention.

The concavely curved region 7 has a minimum 7' which has a defined radius of curvature R. The radius of curvature R is determined at the point of the minimum 7' in a known way. A width 81 of the concavely curved region 7, 11, in which the higher compressive residual stresses $\sigma_E$ are present, is at least 3-5 times the radius of curvature R and is in particular arranged centrally around the minimum 7'. The concavely curved region 7, 11 having the width 81 is adjoined, in the direction of the longitudinal axis 37, by at least one convexly curved region 10, 12 having the lower compressive residual stresses $\sigma_E$.

The compressive residual stress $\sigma_E$ in the concavely curved region 7, 11 having the higher compressive residual stresses $\sigma_E$ is at least 30% or 50% or 60%, in particular 75%, higher than the compressive residual stresses $\sigma_E$ in the convexly curved region 10 having a lower compressive residual stress $\sigma_E$.

The level of the compressive residual stresses $\sigma_E$ in the concavely curved region 7 can also be correlated with a yield strength $R_p$ of the material of the component 1, 120, 130, 342, 354.

By way of example, it is possible to use the yield strength $R_{p\ 0.2}$, in which case, for example, the compressive residual stress $\sigma_E$ is at least 30%, in particular at least 50% of the yield strength $R_{p\ 0.2}$.

Figure 19:
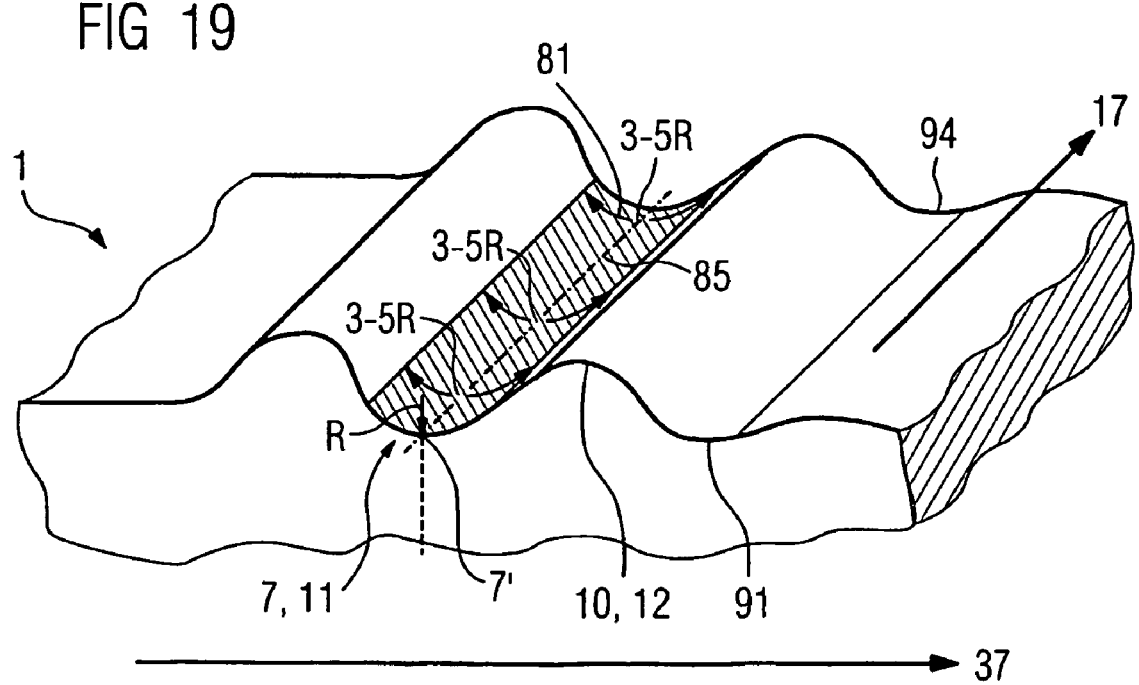

The component 1 or the blade or vane root 43 of the turbine blade or vane 13, 120, 130, 342, 354 extends in a direction 17, for example from one end 91 to the other end 94 (FIG. 19) perpendicular to the longitudinal axis 37. The concavely curved region 7, 11 is a curved surface having a width 3 to 5 times R (=81) about a line 85 which connects the minima 7' to one another in direction 17. In direction 17, the concavely curved region 7, 11 extends over the width of the component 1, 120, 130, i.e. from the end 91 to the end 94. The width 81 is the length of the curved contour profile about the minimum 7'.

If, in accordance with the prior art, only a single shot-peening nozzle 25 is used, first of all it is only possible to generate high compressive residual stresses $\sigma_E$, and it is not then possible to generate low compressive residual stresses $\sigma_E$, or vice versa.

Figure 5:
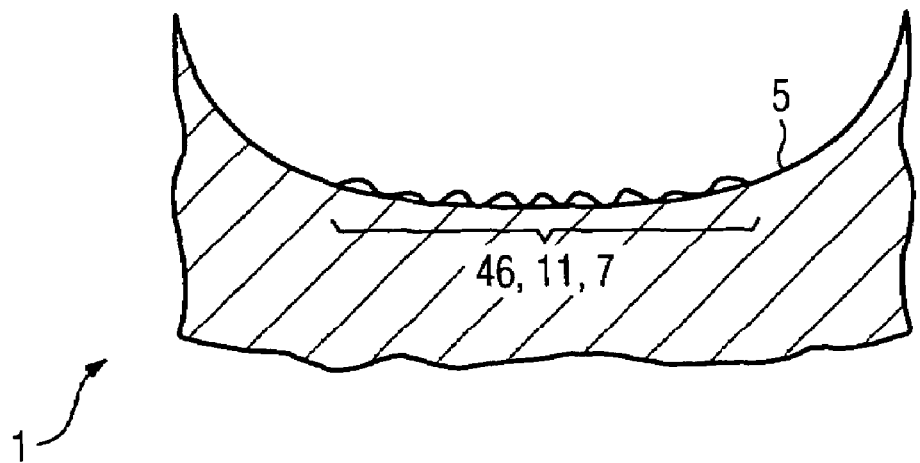
FIGS. 5 to 13, 20, 21 show various process sequences of the process according to the invention.

FIG. 5 shows a subregion of the surface 5 of a component 1, 13, 120, 130, 342, 354.

In a first process step, shot-peening of a concavely curved region 46 is carried out with a high peening pressure.

Figure 6:
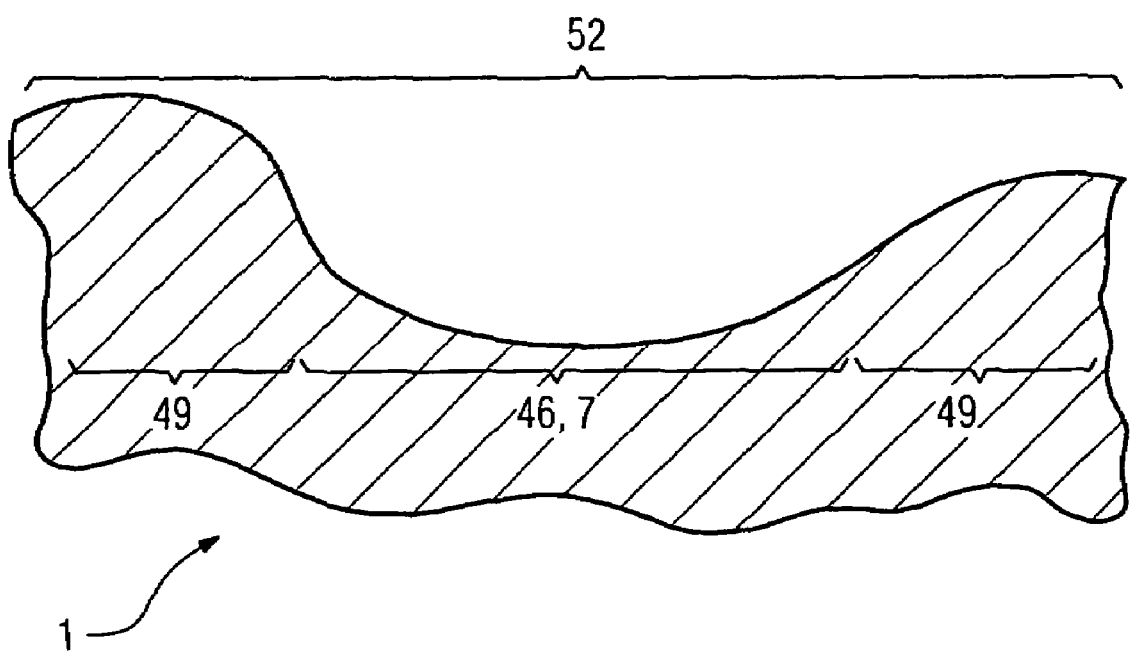

In a further process step, other, adjacent regions 49 are treated, using shot-peening with a lower peening pressure (FIG. 6).

The process can be applied to newly produced components 1, 120, 130, 342, 354 and to refurbished components 1, 120, 130, 342, 354.

Refurbishment means that after they have been used components 1 if appropriate have layers removed from them or are examined for cracks, which are repaired if appropriate. Compressive residual stresses $\sigma_E$ are then generated again.

Figure 7:
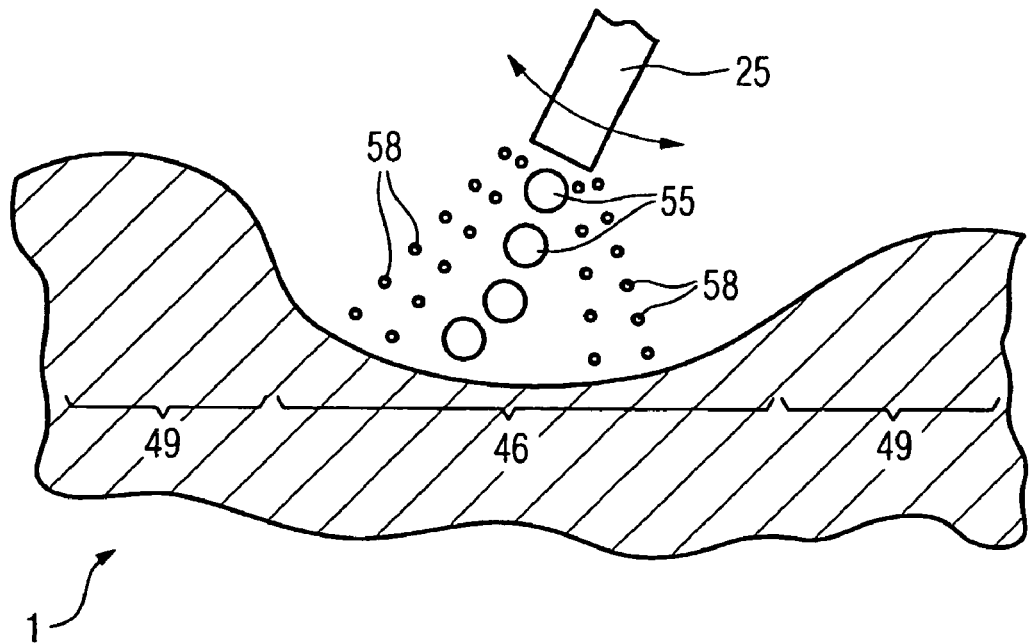

FIG. 7 shows an apparatus in accordance with the prior art which can be used to carry out the process.

In this apparatus, only a single shot-peening nozzle 25 is used.

In a first step, a high peening pressure is introduced in the region 46 (concavely curved region).

Then, a shot jet 29 is diverted onto the regions 49 (concavely curved region) in which lower peening pressures are to be generated, by moving (cf. arrow) the shot-peening nozzle 25 or the component 1, for example by varying the angle of incidence.

This can be achieved by the shot 28 used in the region 46 being subject to lower velocities and therefore lower mechanical momentums or by the shot-peening nozzle 25 blasting out shot 28 of smaller diameter 58 into the regions 49.

If the shot 28 has a smaller diameter, it is possible to generate different peening pressures, for example by the materials of the shot having different hardnesses. By way of example, ceramic material can be used for hard material and metallic material can be used as soft material.

Large shot 55 generates a higher peening pressure than smaller shot 58 given the same velocity.

It is also possible to use small ceramic shot and large metallic shot.

Further possible combinations of different materials, diameters and shape of the shot are conceivable, for example in order to achieve an abrasive action or to reduce the roughness or to achieve a smoothing action.

If, in accordance with the invention, a plurality of shot-peening nozzles 25, 25', 25", 25''', 25'''' are used, these nozzles can be operated a) individually or in pairs at successive time intervals or b) simultaneously.

Figure 9:
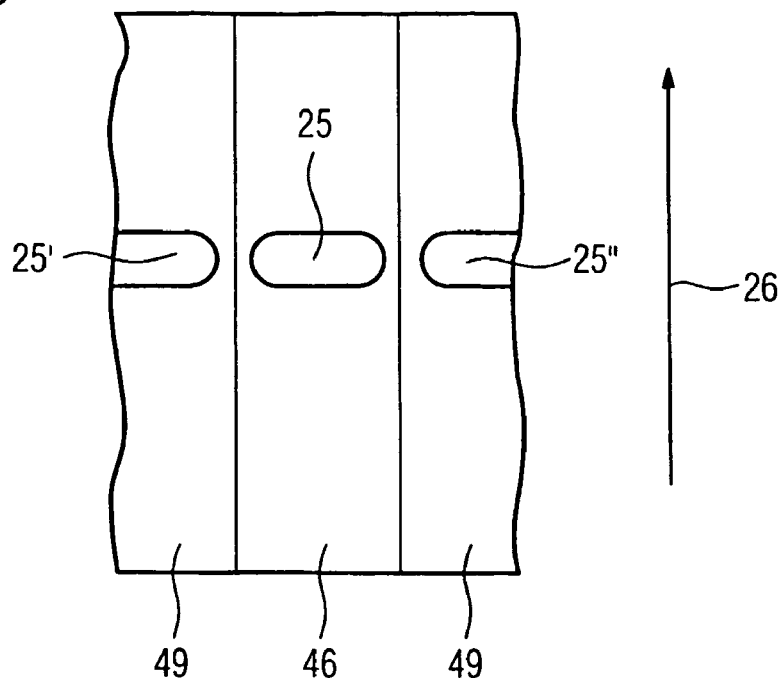
Figure 10:
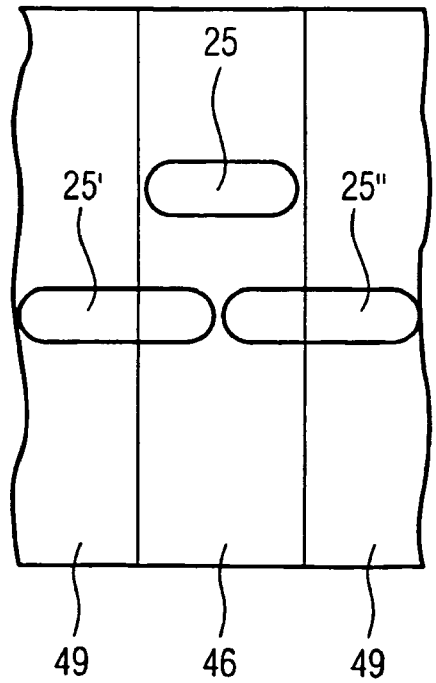
Figure 11:
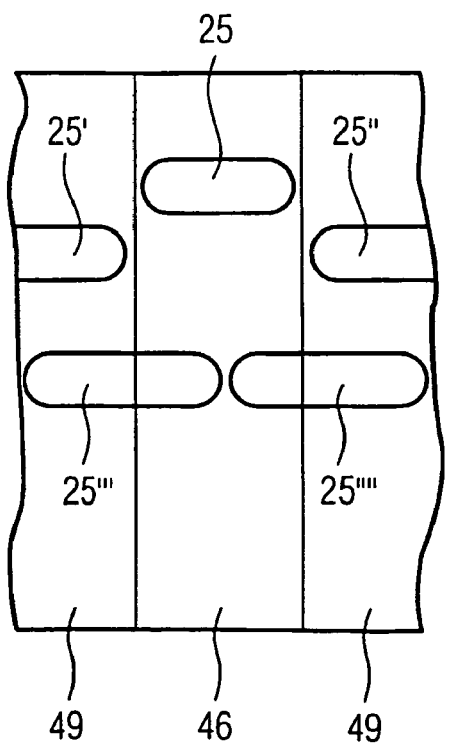

If the shot-peening nozzles 25, 25', 25", 25''', 25'''' are operated simultaneously, the shot-peening nozzles 25, 25', 25", 25''', 25'''' may be arranged locally at the same height (FIG. 9) or may be offset with respect to one another, i.e. one or more shot-peening nozzles are in a leading position and the other or others are in a trailing position (FIGS. 10, 11).

Figure 8:
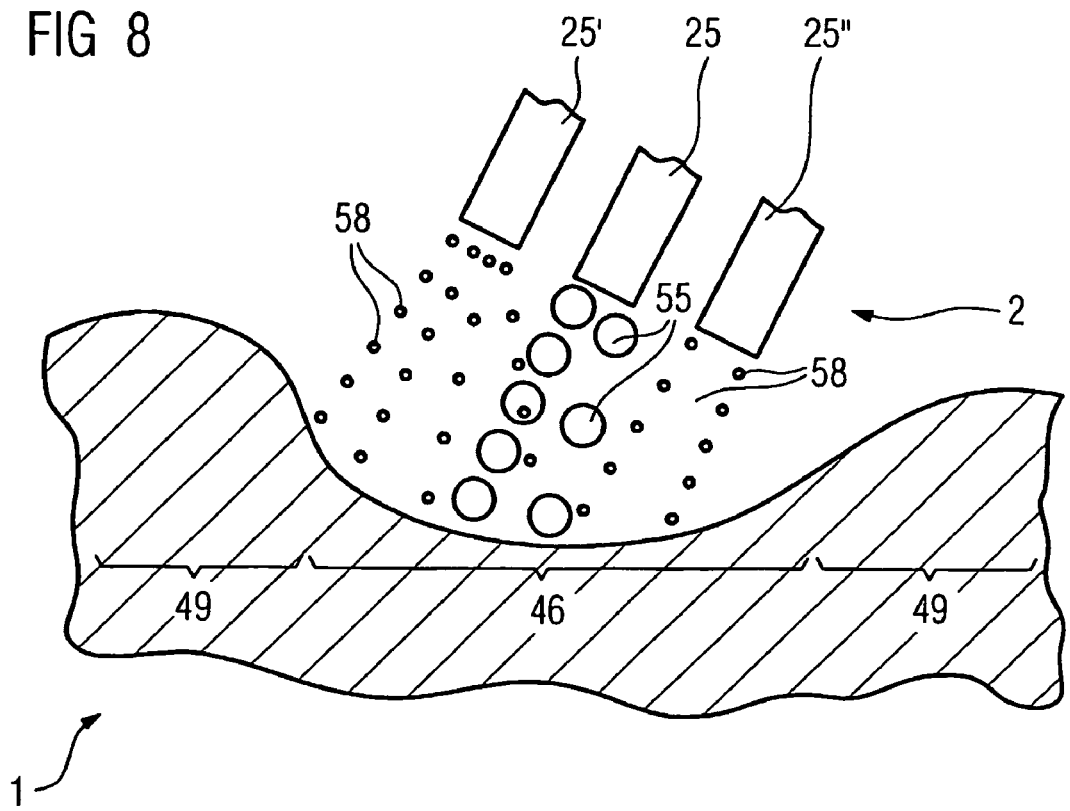

FIG. 8 shows an apparatus 2 which can be used to carry out the process according to the invention.

In this apparatus 2, by way of example, a plurality of, at least two, in this case three shot-peening nozzles 25, 25', 25" are used.

By way of example, the shot-peening nozzle 25 can be used first of all, in order to expose the region 46 (concavely curved region) to a high peening pressure.

In a second step, only the other shot-peening nozzles 25', 25" are used, in order to expose the regions 49 (concavely curved region) to lower peening pressures (for example for smoothing purposes).

It is also possible for the three shot-peening nozzles 25, 25', 25" shown by way of example in FIG. 8 to be operated simultaneously (to generate compressive residual stresses and to provide a smoothing action).

In this case, one or two shot-peening nozzles 25', 25", for example which generate lower peening pressures, can likewise effect peening into the region 46 (i.e. peening a region 52, FIG. 6) (FIGS. 10, 11).

In this case, a shot-peening nozzle 25 generates a high peening pressure and peens the concavely curved region 46, and the second or further shot-peening nozzle 25', 25" generates a lower peening pressure than the shot-peening nozzle 25 and peen at least the convexly curved region 49.

Figure 20:
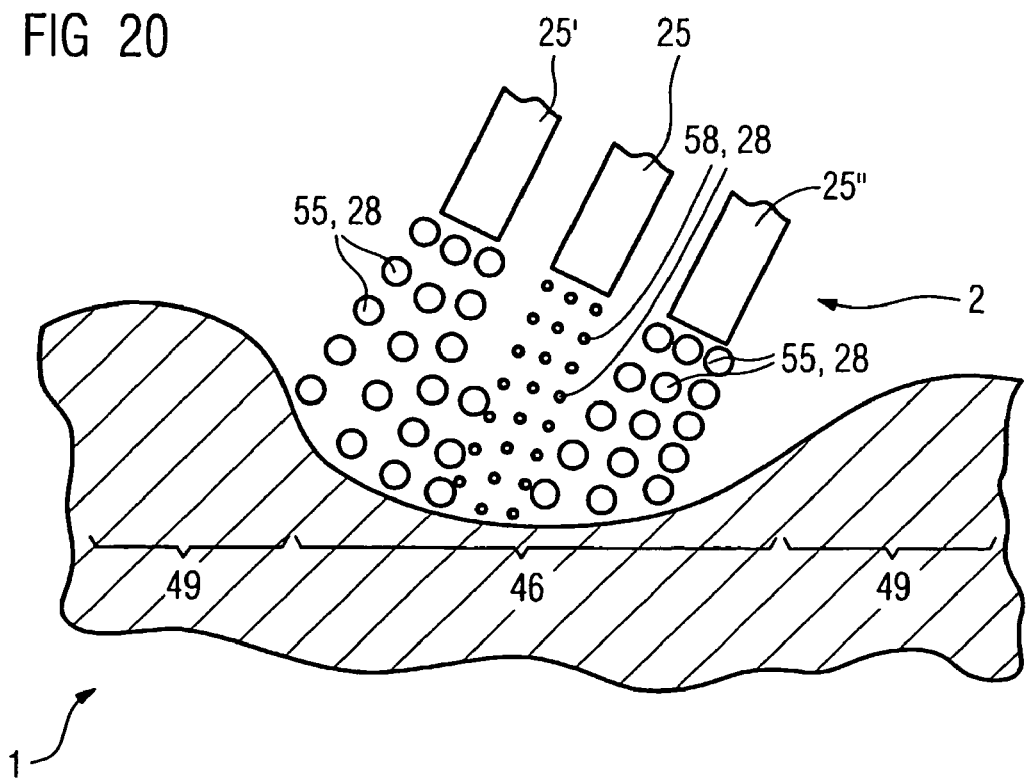

It is also possible for the shot-peening nozzle 25 to have shot 28 of a smaller diameter 58 in order to generate high intensities and high compressive residual stresses, and for the shot-peening nozzles 25', 25" to carry out peening using shot 28 of a larger diameter 55, generating low intensities and lower compressive residual stresses in the regions 49, while at the same time peening into the region 46 in order to smooth the latter (FIG. 20).

The choice of parameters can be adapted to the specific demands imposed on the level of compressive residual stresses and smoothing.

Figure 21:
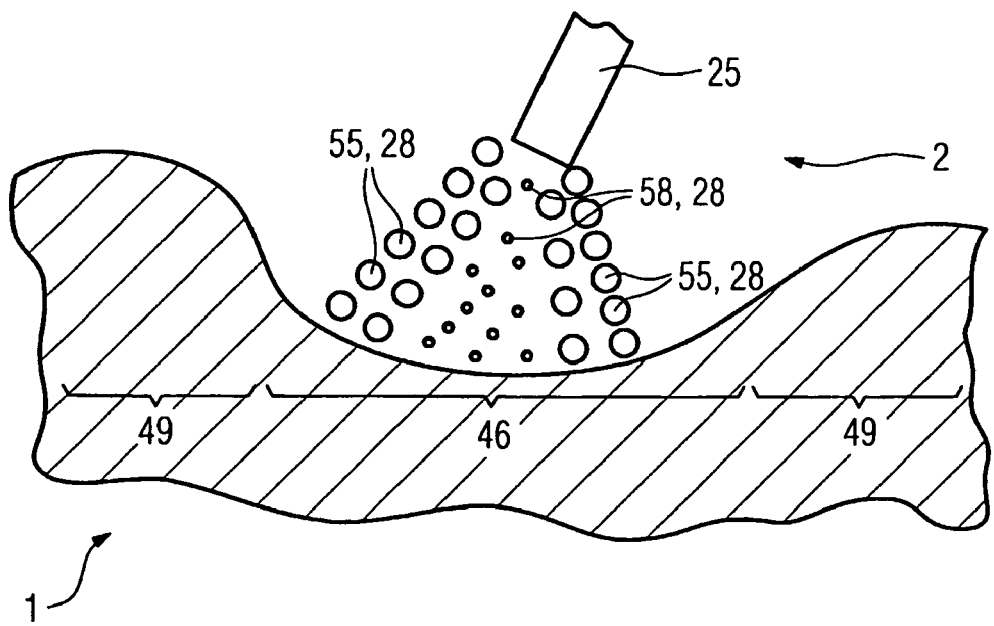

It is also possible for a single shot-peening nozzle 25 to have shot of different diameters 55, 58 and to simultaneously peen a defined region, in this case the regions 46, 49 (FIG. 21).

Irrespective of whether the shot-peening nozzles 25, 25', 25" are operated simultaneously or in succession at time intervals, different parameters can be set for each shot-peening nozzle 25, 25', 25".

The peening pressure, the size of the peening abrasive 28, the material of the peening abrasive 28 or the angle of incidence α can be selected as parameters for the shot-peening nozzle 25, 25', 25".

In particular, the shot-peening nozzle 25 and the shot-peening nozzles 25', 25" have different parameters, in particular different peening pressures. The shot-peening nozzles 25, 25', 25" may be present at one level next to one another, i.e. as indicated in FIG. 9, or may be arranged behind one another (FIGS. 10, 11).

The different parameters for the shot-peening nozzles 25, 25', 25" are predetermined and the regions 46, 49 are moved over for example in one operation. This takes place, for example, in such a way that the shot-peening nozzles 25, 25', 25" are, for example, in a fixed position and the component 1 is mounted on a movable base (CNC machine) and is moved beneath the shot-peening nozzles 25, 25', 25". The component 1 can also be moved in reciprocating fashion, so that the regions 46, 49 are peened more than once. This procedure means that the regions 7, 10 in which different compressive residual stresses are to be generated do not have to be successively exposed to shot jets. This leads to a considerable time saving.

The region on the surface 5 of the component 1 which is peened by a shot-peening nozzles 25, 25', 25' may be round or oval, with the individual regions adjoining one another.

FIG. 9 shows a plan view onto the regions 46 and 49 and the exemplary arrangement of shot-peening nozzles 25, 25' and 25" used. The shot-peening nozzles 25, 25', 25" are in this case arranged at the same level.

The shot-peening nozzles 25, 25', 25" are moved over the regions 46 and 49 in a direction of movement 26. This can take place in one working step, in which all three nozzles 25, 25' and 25" are operated simultaneously, in which case a higher compressive residual stress $\sigma_E$ is generated in the region 46 by the shot-peening nozzle 25 and lower compressive residual stresses $\sigma_E$ are generated in the adjoining regions 49.

The shot-peening nozzle 25 and the shot-peening nozzles 25' and 25" can also be operated in succession at time intervals. For example, in a first process step it is possible for only the shot-peening nozzle 25 to be operated, which then generates high compressive residual stresses $\sigma_E$ in the region 46. In a second or further process steps, the shot-peening nozzle 25 is no longer operated, but instead the shot-peening nozzles 25' and 25" are operated, which generate lower compressive residual stresses $\sigma_E$ in the regions 49 adjoining the region 46. The nozzles 25', 25" may also be offset with respect to the nozzle (FIG. 11).

In this case, the shot-peening nozzles are, for example, jointly mounted on a carrier and are moved jointly even when they 25, 25', 25" are not operating, i.e. shot-peening, together.

FIG. 10 shows a further way of generating compressive residual stresses $\sigma_E$ in the regions 46 and 49.

The openings of the shot-peening nozzles 25' and 25" are in this case, for example, elongate in form or produce an elongate impingement surface on the component 1, 120, 130, 342, 354 and cover, for example, both the region 49 and the adjoining region 46. This is desirable, for example, if the region 46 is to be smoothed in this way. Therefore, the shot-peening nozzles 25' and 25" are locally offset with respect to the shot-peening nozzle 25 in the direction of movement. By way of example, the shot-peening nozzle 25 is arranged in a leading position and the shot-peening nozzles 25' and 25" in a trailing position. In this case too, the shot-peening nozzles 25, 25' and 25" can be operated at the same time or in succession.

By way of example, the nozzle 25 can be used to generate compressive residual stresses $\sigma_E$ and the nozzles 25', 25" can be used for smoothing purposes.

In this case, the shot-peening nozzles are, for example, mounted jointly on one carrier and are moved together, even when they 25, 25', 25" are not operating, i.e. shot-peening, together.

FIG. 11 shows a further arrangement of shot-peening nozzles. In this case, five shot-peening nozzles 25, 25', 25", 25''' and 25'''' are used. The parameters for the individual shot-peening nozzles 25 and 25', 25" and 25''' and 25'''' can in each case be different and adapted to the desired requirements.

By way of example, the nozzles 25, 25', 25" can be used to generate compressive residual stresses $\sigma_E$ and by way of example the nozzles 25''', 25'''' can be used to provide a smoothing action.

The shot-peening nozzle 25 covers the region 46, whereas the shot-peening nozzles 25', 25" cover in each case only the respectively adjoining regions 49.

The shot-peening nozzles 25''', 25'''' which follow in local terms are used to provide a smoothing action and in this case, by way of example, cover both the region 46 and the region 49.

In this case, the shot-peening nozzles are, for example, mounted jointly on a carrier and are moved jointly, even when they 25, 25', 25" are not operating, i.e. shot-peening, together.

Figure 12:
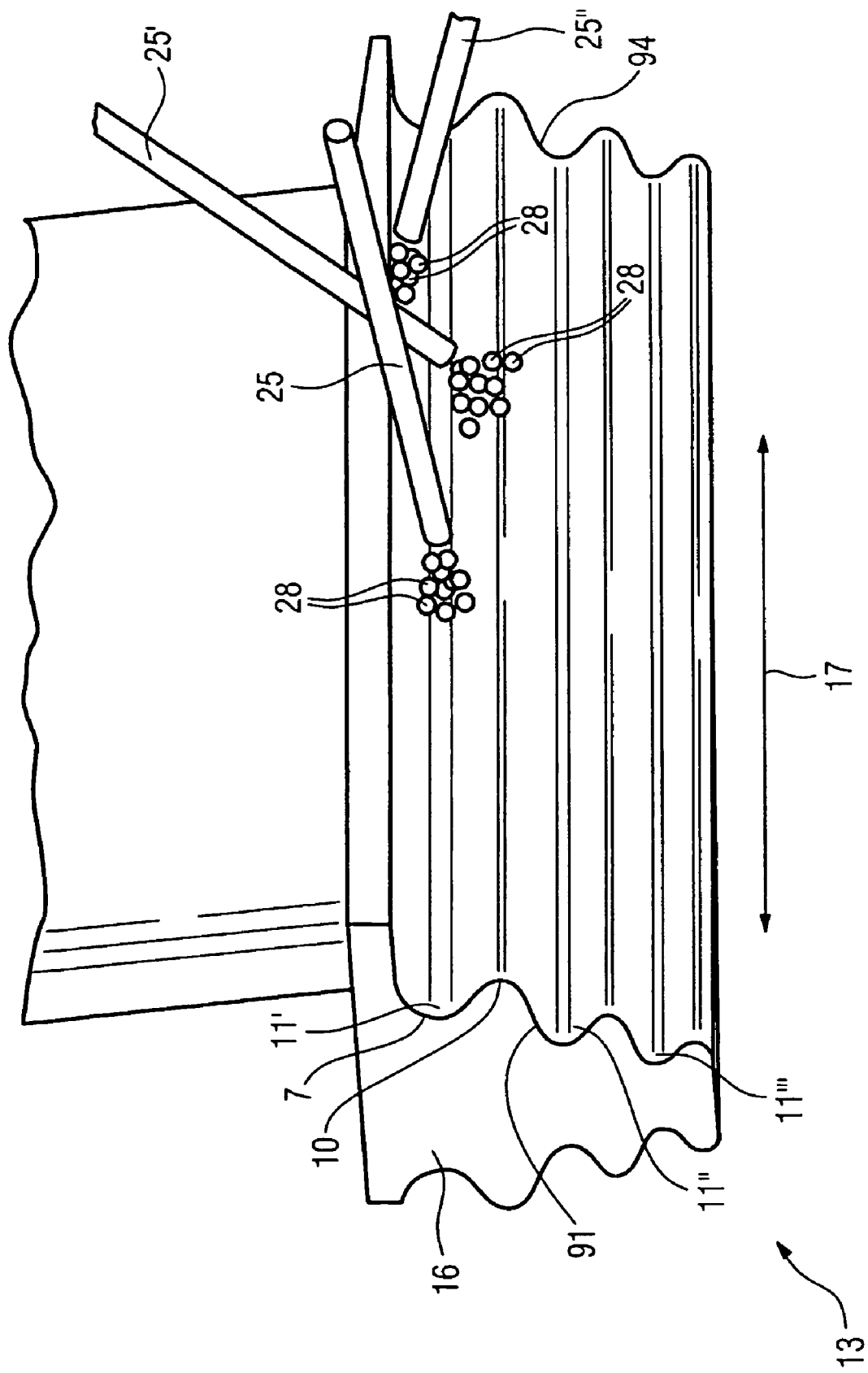

FIG. 12 shows, as component 1, a turbine blade or vane 13 including its blade or vane root 43, which is of fir-tree-like design in the securing region 16. The blade or vane root 43 has concavely curved regions 7, in which high compressive residual stresses $\sigma_E$ are to be present, and has convexly curved regions 10, in which lower compressive residual stresses $\sigma_E$ than in the convexly curved region 7 are to be present.

The blade or vane root 43 has, for example, three valleys or grooves 11', 11", 11''', the three shot-peening nozzles 25, 25', 25", for example in terms of their parameters, being set fixedly with respect to the first groove 11'.

The turbine blade or vane 13 or the component 1 is displaced along a direction 17 with respect to the shot-peening nozzles 25, 25' and 25", so that the entire groove 11' is peened. This operation can be repeated for the further grooves 11" and 11''', or further shot-peening nozzles are correspondingly present for the grooves 11" and 11''', allowing simultaneous processing of all the grooves.

Figure 13:
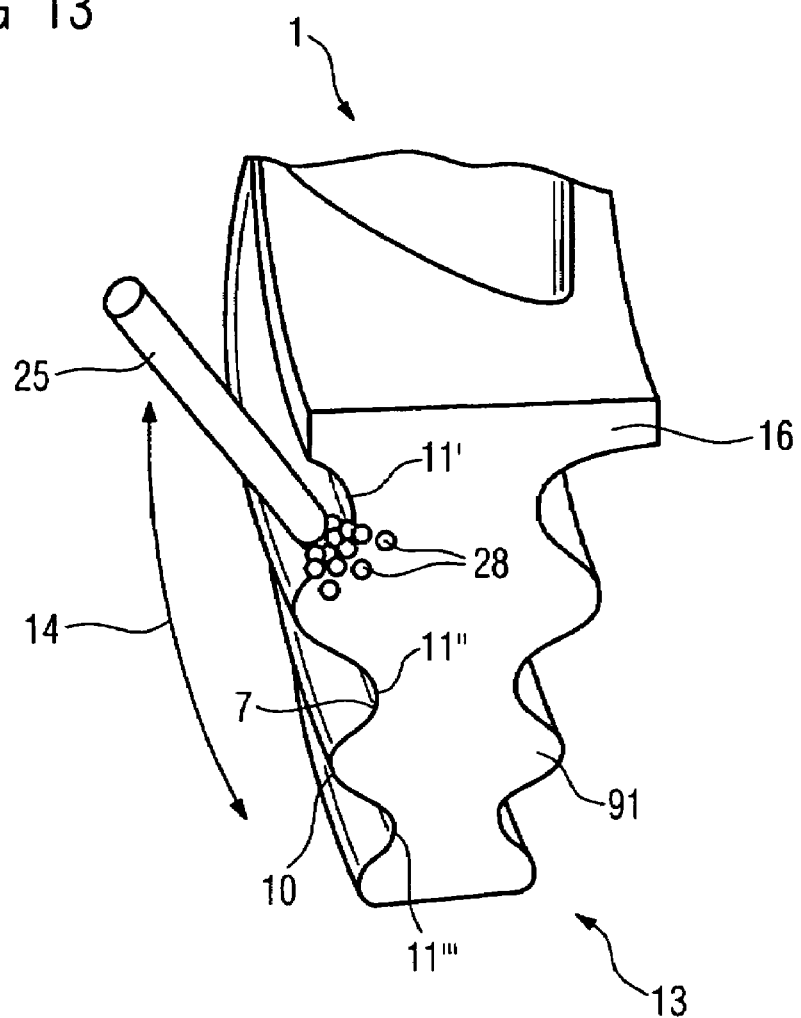

FIG. 13 diagrammatically indicates that the edges of the grooves 11', 11", 11''' are likewise peened in order to generate compressive residual stresses $\sigma_E$. It can also be seen that the component 1 is inherently curved.

Figure 14:
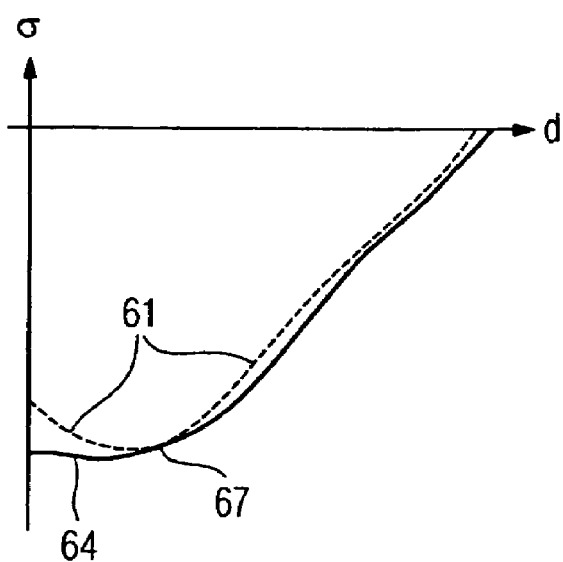
FIG. 14 shows a compressive stress profile plotted over the depth of a component.

FIG. 14 shows the theoretical profile of the compressive residual stress $\sigma_E$ in a component 1 as results from a peening operation.

The diagram plots the compressive residual stress $\sigma_E$ over the depth d of a component 1. The maximum 67 of the compressive residual stress $\sigma_E$ does not lie at the surface 4 of the component 1, i.e. at d=0, but rather in the interior of the component 1 (d>0). The curve 61 illustrated by a dashed line shows the profile of the compressive residual stress $\sigma_E$.

However, it is desirable for a maximum value of the compressive residual stress $\sigma_E$ to be present at the surface 5 of the component 1. The solid line of curve 64 shows this desired profile of the compressive residual stress $\sigma_E$.

The desired profile 64 can be achieved, for example, in the following way. In a first operation, a concavely curved region 7, 10 is peened using a high peening pressure. In a second operation, the same region 7, 10 is peened with a lower intensity, so that the maximum shifts to the surface 5 of the component 1. However, this may also take place in a single operation as described above.

The result of this is that the maximum of the compressive residual stress $\sigma_E$ is present at the surface 5 or near to the surface 5 yet nevertheless there is a high depth of penetration of the compressive residual stress $\sigma_E$ into the component 1.

Figure 15:
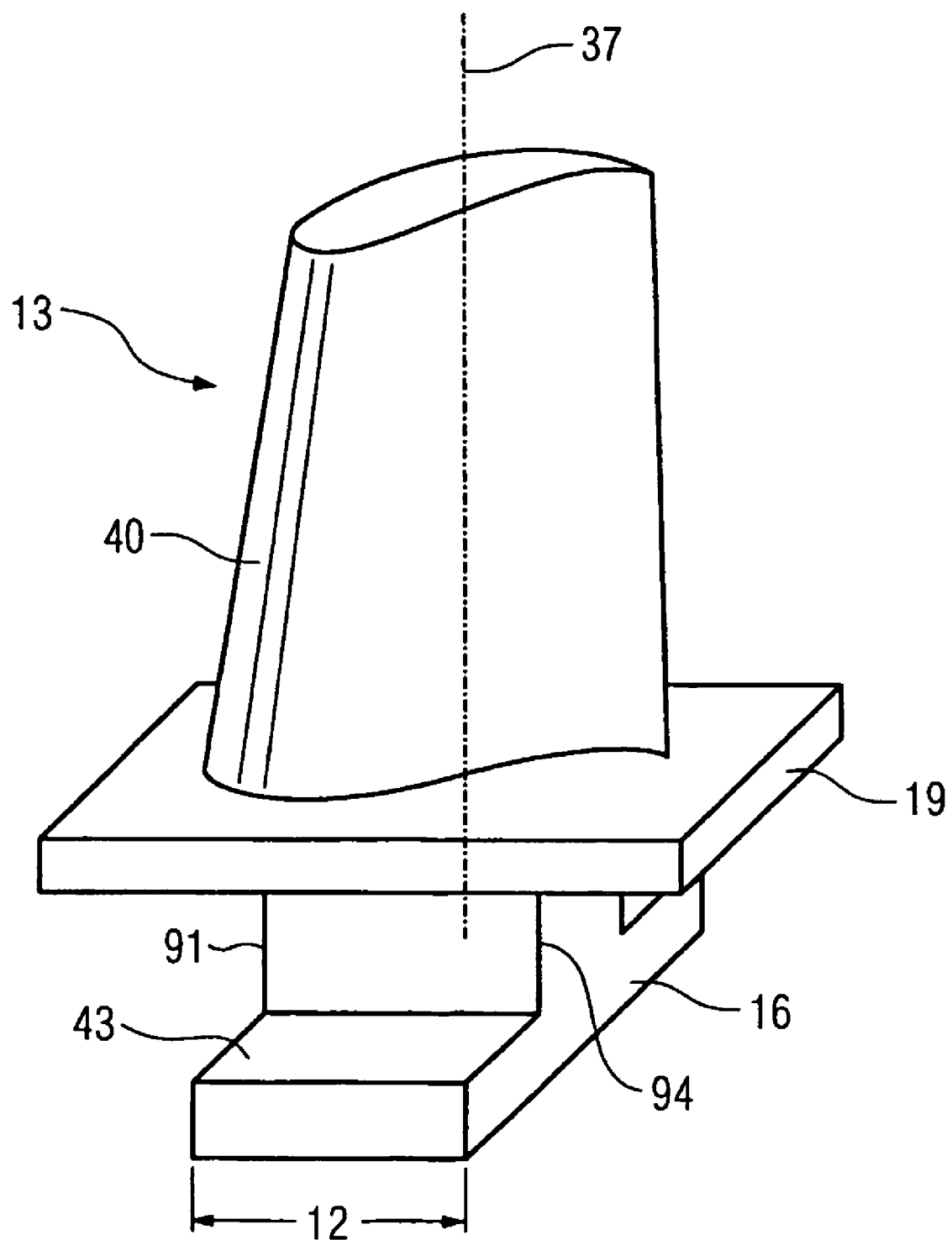
FIG. 15 shows a turbine blade or vane.

FIG. 15 shows a component 13 which can be treated by means of the process according to the invention.

FIG. 15 shows a perspective view of a turbine blade or vane 13 for example for a steam turbine, which extends along a longitudinal axis 37. In the case of conventional turbine blades or vanes 13, solid metallic materials are used in all regions 40, 19, 43 of the rotor blade 1.

The turbine blade or vane 13 can in this case be produced by a casting process, by a forging process, by a milling process or by combinations thereof. The turbine blade or vane 13 has, in succession along the longitudinal axis, a securing region 16, an adjoining blade or vane platform 19 and a main blade or vane region 40. A blade or vane root 43, which is used to secure the turbine blade or vane 13 to the disk 22 of a turbomachine (not illustrated), is formed in the securing region 16. The blade or vane root 43 is configured in the shape of a hammerhead. Other configurations, for example as a fir-tree root (FIG. 2) or a dovetail root, are possible.

The fir-tree root 43 has compressive residual stresses that are different than zero at least in a concavely curved region 7 and the adjoining convexly curved region 10, so that compressive residual stresses are present over a large area at the surface of the blade or vane root, in particular everywhere.

FIG. 16 shows, by way of example, a partial longitudinal section through a gas turbine 100.

In the interior, the gas turbine 100 has a rotor 103 which is mounted such that it can rotate about an axis of rotation 102 and is also referred to as the turbine rotor. An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed from two blade or vane rings. As seen in the direction of flow of a working medium 113, in the hot-gas passage 111 a row of guide vanes 115 is followed by a row 125 formed from rotor blades 120.

The guide vanes 130 are secured to the stator 143, whereas the rotor blades 120 of a row 125 are fitted to the rotor 103 for example by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and the rotor blades 120 of the first turbine stage 112, as seen in the direction of flow of the working medium 113, together with the heat shield bricks which line the annular combustion chamber 106, are subject to the highest thermal stresses. To be able to withstand the temperatures which prevail there, they are cooled by means of a coolant.

The substrates may likewise have a directional structure, i.e. they are in single-crystal form (SX structure) or have only longitudinally oriented grains (DS structure). Iron-base, nickel-base or cobalt-base superalloys are used as material.

The blades or vanes 120, 130 may also have coatings which protect against corrosion (MCrAlX; M is at least one element selected from the group consisting of iron (Fe), cobalt (Co), nickel (Ni), X stands for yttrium (Y) and/or at least one rare earth element) and heat by means of a thermal barrier coating. The thermal barrier coating consists, for example, of $ZrO_2$, $Y_2O_4$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here) which faces the inner housing 138 of the turbine 108, and a guide vane head which is at the opposite end from the guide vane root. The guide vane head faces the rotor 103 and is fixed to a securing ring 140 of the stator 143.

FIG. 17 illustrates, by way of example, a steam turbine 300, 303 with a turbine shaft 309 extended along an axis of rotation 306.

The steam turbine has a high-pressure part-turbine 300 and an intermediate-pressure part-turbine 303, each with an inner casing 312 and an outer casing 315 surrounding it. The high-pressure part-turbine 300 is, for example, of pot-type design. The intermediate-pressure part-turbine 303 is of two-flow design. It is also possible for the intermediate-pressure part-turbine 303 to be of single-flow design.

Along the axis of rotation 306, a bearing 318 is arranged between the high-pressure part-turbine 300 and the intermediate-pressure part-turbine 303, the turbine shaft 309 having a bearing region 321 in the bearing 318. The turbine shaft 309 is mounted on a further bearing 324 next to the high-pressure part-turbine 300. In the region of this bearing 324, the high-pressure part-turbine 300 has a shaft seal 345. The turbine shaft 309 is sealed with respect to the outer casing 315 of the intermediate-pressure part-turbine 303 by two further shaft seals 345. Between a high-pressure steam inflow region 348 and a steam outlet region 351, the turbine shaft 309 in the high-pressure part-turbine 300 has the high-pressure rotor blading 354, 357. This high-pressure rotor blading 354, 357, together with the associated rotor blades (not shown in more detail), constitutes a first blading region 360. The intermediate-pressure part-turbine 303 has a central steam inflow region 333. Assigned to the steam inflow region 333, the turbine shaft 309 has a radially symmetrical shaft shield 363, a cover plate, on the one hand for dividing the flow of steam between the two flows of the intermediate-pressure part-turbine 303 and also for preventing direct contact between the hot steam and the turbine shaft 309. In the intermediate-pressure part-turbine 303, the turbine shaft 309 has a second blading region 366 comprising the intermediate-pressure rotor blades 354, 342. The hot steam flowing through the second blading region 366 flows out of the intermediate-pressure part-turbine 303 from an outflow connection piece 369 to a low-pressure part-turbine (not shown) which is connected downstream in terms of flow.

The turbine shaft 309 is composed, for example, of two turbine part-shafts 309*a* and 309*b*, which are fixedly connected to one another in the region of the bearing 318.

The invention claimed is:

1. A process for producing a turbine component, comprising:
    shot peening a surface region of the component to produce a locally different compressive residual stress on the region by a first shot peening nozzle; and
    shot peening the surface region to produce a smoothed surface finish by a second shot peening nozzle,
    wherein the two shot peening nozzles are operated simultaneously and different peening pressures and shot diameters are used for the two shot-peening nozzles.

2. The process as claimed in claim 1, wherein the surface region has a plurality of concavely curved and a convexly curved regions.

3. The process as claimed in claim 1, wherein the second shot-peening nozzle is operated after the first shot-peening nozzle.

4. The process as claimed in claim 2, wherein operating parameters for the shot-peening nozzle are selected from the group consisting of: peening pressure, peening abrasive size, peening abrasive material, peening angle of incidence, and peening blasting shape.

5. The process as claimed in claim 2, wherein different parameters are set for the first and second nozzles and the concavely curved regions and a convexly curved regions are peened at the same time by multiple passes by the nozzles over the concavely and convexly curved regions.

6. The process as claimed in claims 1, wherein the shot peen nozzles or the component are guided in a controlled way based on scanning of the component regions by a laser.

7. The process as claimed in claim 6, wherein the second nozzle is operated using a lower peening pressure and a larger diameter shot than was used with the first nozzle.

8. The process as claimed in claim 7, wherein the first nozzle contains shot of different size diameter.

9. The process as claimed in claim 8, wherein the first and second nozzles contain shot of different material hardness.

10. The process as claimed in claim 9, wherein the shot is made from ceramic or metal.

11. The process as claimed in claim 10, wherein the component is a blade, a vane or a heat shield element.

12. The process as claimed in claim 11, wherein the angle of incidence between a peening direction of a shot-peening nozzle and a curved surface of the component is between 80° and 85°.

13. The process as claimed in claim 2, wherein in a first process step a shot-peening treatment of a region is performed using a defined peening pressure, and in a second process step the same region is peened using a lower peening pressure to shift the maximum of the compressive residual stress to the surface of the component.

* * * * *